United States Patent

[11] 3,545,405

| [72] | Inventor | Keith B. Jefferts<br>82 Blackburn Road, Summit, New Jersey 07901 |
|---|---|---|
| [21] | Appl. No. | 809,650 |
| [22] | Filed | March 24, 1969 |
| [45] | Patented | Dec. 8, 1970 |

[54] APPARATUS FOR INVESTIGATING THE MIGRATORY HABITS OF MACRO-ORGANISMS
8 Claims, 2 Drawing Figs.

[52] U.S. Cl. .................................................. 119/3, 128/330
[51] Int. Cl. ...................................................... A01k 61/00
[50] Field of Search .......................................... 119/3, 4, 5; 128/217, 330; 317/262

[56] References Cited
UNITED STATES PATENTS
2,121,787  6/1938  Dahlgren ...................... 317/262

3,128,744  4/1964  Jefferts et al. .................  119/3
3,313,301  4/1967  Jefferts et al. .................  128/330

*Primary Examiner*—Aldrich F. Medbery
*Attorney*—Kenyon & Kenyon, Reilly, Carr & Chapin ABSTRACT: The disclosure relates to an identifying tag which is capable of being implanted in a macro-organism and upon retrieval thereof aids in determining the movements of the macro-organism from one habitat to another. The identifying tag is a small metallic body, preferably of a cylindrical shape, which can be cut from a continuous length of wire. Each individual segment of wire is implanted into a macro-organism under study. The identifying tag contains along the surface thereof coded information in the form of a predetermined pattern which is imparted on the surface of the body by a high-energy heat source, such as by focusing laser pulses in a predetermined pattern on the surface of the body.

PATENTED DEC 8 1970

3,545,405

INVENTOR.
KEITH B. JEFFERTS
BY
Kenyon & Kenyon
ATTORNEYS

APPARATUS FOR INVESTIGATING THE MIGRATORY HABITS OF MACRO-ORGANISMS

This invention pertains generally to an apparatus for investigating the migratory habits of macro-organisms and more specifically to an identifying tag which is adapted to be implanted in the macro-organism.

In U.S. Pat. No. 3,128,744, issued Apr. 14, 1964 to Peter K. Bergman and myself, there is disclosed a method for investigating the migratory habits of macro-organisms. Therein is disclosed a method wherein the organism of interest is implanted with a relatively small tag which contains identifying data thereon. The organism is then released to exist in its normal environment and subsequently recovered along with a mass of organisms when they are ultimately removed from their normal environment. All the organisms are passed through a detecting means which is capable of identifying those organisms which contain the identifying tag therein. The detecting means is preferably a magnetic detecting apparatus and the implanted tag is of a magnetic material. Upon retrieval of the organism containing the identifying tag, the tag is removed therefrom and the identifying data is deciphered and used for establishing research statistics.

The identifying tags as described in the aforementioned patent preferably contain coding in the form of variously colored epoxy paints disposed along the surface of the diameter of the wire. When utilizing a small size wire, such as a stainless steel rod 0.010 inch in diameter, it has been found possible to place six side-by-side strips of differing colors on the surface in order to provide the identifying data. Also described in the aforementioned patent is the utilization of magnetically coded identifying tags. The magnetic coding is placed on the relatively small identifying tag in accordance with the principles of wire recordings.

The method of investigating the migratory habits of macro-organisms disclosed in the aforementioned patent, previously described, has proved usable for fairly extensive biological studies to date. These studies have primarily been conducted on various species of salmon. However, more extensive use has been somewhat limited because of the limited application of the coded data contained on the identifying tags. The wire size must be small, in the order of .010 of an inch in diameter, for biological reasons. Coding of such a size wire with a plurality of different paint colors is slow and requires elaborate application machinery. Further, this method has proven to be economically expensive because constant attention of skilled operators is necessary during the application of the paint onto the surface of the wire. A further drawback in the usage of color coded paint is presented in that color changes and/or lack of adhesion of the paint to the wire when embedded in the organism causes confusion or total loss of information during the research program. Also, the application of the epoxy paint causes the wire diameter to increase and causes surface irregularities which present difficulties during the implanting of the identifying tag onto the organism, such as frequent clogging of the implanting apparatus. Further limitations are presented in that a change in the color coding, namely namely, the use of different colors for the adjacent strips requires considerable machine changeover and downtime.

It has been found that magnetic coding of a tag with a geometry of .010 of an inch diameter by .040 of an inch long has serious limitations and yet this geometry is necessary for biological reasons. Magnetic coding as presently within the state of the art allows a maximum of approximately 16 different codings to be placed on the tag. Further, usage of magnetic detection methods requires that the magnetic moment of the wire segment may not be reduced by reversing the magnetism contained in its parts. Namely, the requirements of magnetic detection with reasonable sensitivity and magnetic coding are mutually exclusive. Because of these and other factors, the tags of the aforementioned patent are limited in use. Further, more widespread utilization for more extensive and elaborate research programs is seriously hindered with such an identifying tag.

The apparatus disclosed herein overcomes the deficiencies of the prior art by using a relatively small metallic body which is small enough from a biological standpoint and contains along the surface thereof coded information in the form of identifying marks. The coded information is contained on the surface of the metallic body in a predetermined pattern which is imparted thereon by a high-energy heat source. The markings may be imparted on to the wire surface by any of a number of methods utilizing a high energy heat source. Typical methods include spark erosion of the wire surface, thermal oxidation of the wire surface, and fusion of the wire surface, all of which may be caused either by electrical discharges or by focusing a laser pulse thereon. Other types of high-energy heat sources may also be substituted.

Accordingly, it is an object of this invention to provide for an improved apparatus for identifying the migratory habits of macro-organisms.

Another object of the invention is to provide for an identifying tag which may be implanted into the body of an organism under study.

A further object of the invention is to provide for an identifying tag containing coded information imparted thereon by a high-energy heat source and which may be implanted into the body of an organism.

These and other objects, advantages and features of the invention will become more apparent from the following description of the preferred embodiment taken in conjunction with the accompanying drawing wherein.

Figure 1:
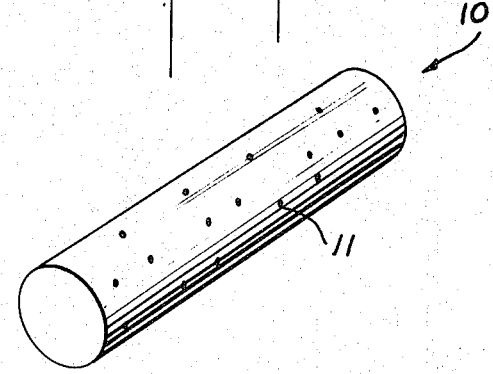
FIG. 1 is a perspective view of an identifying tag.
Figure 2:
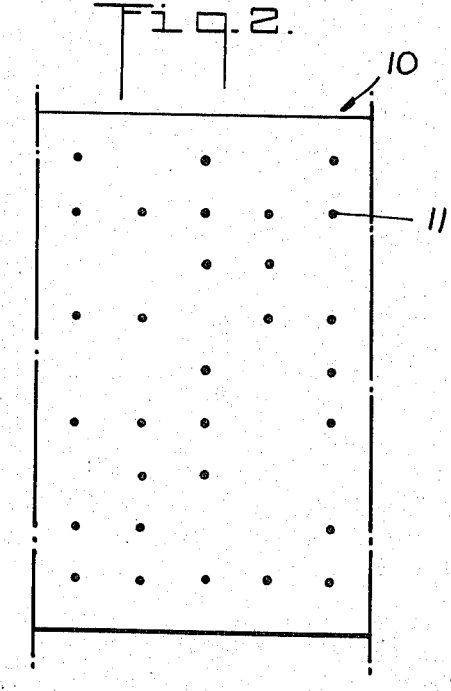
FIG. 2 is a developed view of an identifying tag containing coded information thereon.

With reference to the drawings, the identifying tag, indicated generally at 10, comprises a small segment of wire measuring approximately .010 of an inch in diameter by .040 of an inch long. The material of the identifying tag is preferred to be a type 302 stainless steel which has the requisite magnetic characteristics for detection when the identified organism is recovered. Contained along the surface of the wire segment and arranged in a predetermined pattern is coded information, preferably in binary form, which enables the biologist to identify the tag and thus determine the movements of the organism which has had the tag implanted therein. Each individual piece of the coded information is in the form of a spot or indentation which has been formed preferably by focusing a laser pulse or electrical discharge on the surface of the wire at 11. The markings 11 are of a permanent nature and, unlike the painted stripes contained in the prior art, do not suffer from any of the previously discussed deficiencies. The markings 11, may be imparted on the wire surface by a variety of ways such as by spark erosion of the wire surface. They may also be formed by thermal oxidation of the wire surface and thereby create a spot of adherent chrome oxide, or the markings may be provided by arc fusion of the wire surface. Other high energy heat sources may be substituted for the laser pulse or electrical discharge and accomplish the same end. For example, oxygen-hydrogen microflames, plasma sources, and atomic hydrogen recombination on the surface are all equivalent means which may be used to place the coded information on the wire surface.

The identifying tag prepared in the manner herein described, eliminates the deficiencies of the prior art. It is relatively quick and requires very little attention to place markings on the tag in such a manner. Therefore, the identifying tag of this disclosure costs approximately one-fifth of the cost of a tag having painted stripes, as previously described. Further, the high-energy heat source marking is permanent and does not cause any appreciable change in the wire diameter which heretofore has created numerous problems as the wire is passed through the implanting machine. Painting on the wire surface may cause increases in the effective wire diameter from 20 to 50 percent whereas the method disclosed herein generally will not increase the wire diameter beyond 5 percent. Also, the coded information which is to be imparted in this manner is easily programmed for code changes and provides for almost an indefinite number of different codings. It is therefore readily seen, that by utilization of the identifying tag as disclosed herein a great number of research programs may be conducted without any confusion or loss of data. Further, considerable cost reduction and time saving is also provided.

Other modifications and variations of the invention as hereinbefore set forth may be made without departing from the spirit and scope thereof, and therefore, only such limitations should be imposed as are indicated in the appended claims.

I claim:

1. An identifying tag for implanting in a macro-organism to aid in determining the movement thereof from one habitat to another which comprises a small metallic body suitable for implanting within the macro-organism and having disposed along the periphery thereof coded information, said coded information being in the form of a predetermined pattern imparted on the surface of said body by a high energy heat source.

2. An identifying tag in accordance with claim 1 wherein said coded information comprises a plurality of surface penetrating identifying marks caused by spark erosion of the body surface.

3. An identifying tag in accordance with claim 1 wherein said coded information comprises a plurality of surface identifying marks of adherent chrome oxide caused by thermal oxidation of the body surface.

4. An identifying tag in accordance with claim 1 wherein said coded information comprises surface penetrating identifying marks caused by arc fusion of the body surface.

5. An identifying tag in accordance with claim 1 wherein said high energy heat source comprises a laser pulse which is focused upon the surface of said body to form said coded information.

6. An identifying tag in accordance with claim 1 wherein said metallic body is of a cylindrical shape and of a material that is capable of being magnetized.

7. An identifying tag in accordance with claim 1 wherein said high energy heat source comprises an electrical discharge means which is brought into contact with said body to form said coded information.

8. An identifying tag for implanting within the body of fish to aid investigating the migratory habits thereof which comprises cylindrical metallic body of a size approximately 0.010 inches in diameter by 0.040 inches in length suitable for implanting within the body of the fish and which is capable of being magnetized, said body having disposed along the circumference thereof, binary coded information in the form of a plurality of minute indentations arranged in a predetermined pattern, each of said indentations penetrating a distance into the surface of said metallic body without any substantial enlargement of the diameter of said body.